United States Patent
Canepa et al.

(10) Patent No.: US 10,756,895 B2
(45) Date of Patent: Aug. 25, 2020

(54) USING ENCRYPTION KEYS TO MANAGE DATA RETENTION

(71) Applicant: SEAGATE TECHNOLOGY LLC, Cupertino, CA (US)

(72) Inventors: Timothy Canepa, Los Gatos, CA (US); Ramdas Kachare, Cupertino, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 21 days.

(21) Appl. No.: 16/165,582

(22) Filed: Oct. 19, 2018

(65) Prior Publication Data
US 2019/0058583 A1 Feb. 21, 2019

Related U.S. Application Data

(63) Continuation of application No. 15/217,863, filed on Jul. 22, 2016, now Pat. No. 10,133,681.

(51) Int. Cl.
| G06F 21/44 | (2013.01) |
| H04L 29/06 | (2006.01) |
| H04L 9/08 | (2006.01) |
| H04L 9/32 | (2006.01) |
| G06F 12/14 | (2006.01) |

(52) U.S. Cl.
CPC .......... *H04L 9/088* (2013.01); *G06F 12/1408* (2013.01); *H04L 9/0838* (2013.01); *H04L 9/0897* (2013.01); *H04L 9/3228* (2013.01); *G06F 2212/1052* (2013.01)

(58) Field of Classification Search
CPC .......... G06F 12/14; G06F 21/78; G06F 21/72; H04L 63/04
See application file for complete search history.

(56) References Cited

U.S. PATENT DOCUMENTS

| 7,376,062 B2 | 5/2008 | Hsu et al. |
| 8,370,648 B1 * | 2/2013 | Natanzon ............... H04L 63/068 380/277 |
| 8,938,624 B2 | 1/2015 | Obukhov et al. |
| 2012/0331284 A1 | 12/2012 | Kouladjie et al. |

\* cited by examiner

*Primary Examiner* — Izunna Okeke
(74) *Attorney, Agent, or Firm* — Hall Estill Attorneys at Law

(57) ABSTRACT

Systems and methods for using encryption keys to manage data retention are described. In one embodiment, the systems and methods may include receiving data such as user data from a host of the storage drive, encrypting the data using an encryption key, writing the encrypted data to the storage drive, and retaining the encrypted data on the storage drive based at least in part on a validity of the encryption key.

20 Claims, 6 Drawing Sheets

USING ENCRYPTION KEYS TO MANAGE DATA RETENTION

RELATED APPLICATIONS

This application is a continuation of U.S. patent application Ser. No. 15/217,863, filed on 22 Jul. 2016 and entitled USING ENCRYPTION KEYS TO MANAGE DATA RETENTION, pending, the disclosure of which is incorporated in its entirety by this reference.

SUMMARY

The present disclosure is directed to methods and systems for using encryption keys to manage data retention. In some embodiments, the present systems and methods may retain data on a storage drive in relation to a data retention policy and encrypt the data. In some cases, the data retention policy may specify an expiration for one or more encryption keys used to encrypt the data.

A storage system for using encryption keys to manage data retention is described. In one embodiment, the storage system device may include a storage drive and a controller. In some embodiments, the controller may be configured to encrypt data using an encryption key, write the encrypted data to the apparatus, and retain the encrypted data on the apparatus based at least in part on a validity of the encryption key.

In some embodiments, the controller may be configured to receive the data from a host of the storage drive, wherein the data may include user data. In some embodiments, the controller may be configured to assign an encryption identifier to the encryption key. In some cases, the encryption key may be programmed in the controller. For example, a manufacturer may program one or more encryption keys into the controller. Additionally, or alternatively, a user of the storage drive may program one or more encryption keys into the controller. Additionally, or alternatively, a host command from a host of the storage drive may program one or more encryption keys into the controller.

In some embodiments, the controller may be configured to store the encryption identifier of the encryption key in metadata associated with the encrypted data and identify an expiration policy of the encryption key. In some embodiments, the controller may be configured to store the encryption identifier in a mapping table, the mapping table mapping a logical block address (LBA) of the encrypted data with a physical location on the storage drive.

In some embodiments, the controller may be configured to receive a command to read the encrypted data from the storage media. In some embodiments, the controller may be configured to acquire the encryption identifier associated with the encrypted data. In some embodiments, the controller may be configured to verify a validity of the encryption key based at least in part on acquiring the encryption identifier. Upon determining the encryption key is valid, in some embodiments, the controller may be configured to decrypt the encrypted data using the encryption key and transfer the decrypted data to the host. Upon determining the encryption key is invalid, in some embodiments, the controller may be configured to remove the LBA of the encrypted data from the mapping table and discard the encrypted data from the storage media.

An apparatus for using encryption keys to manage data retention is also described. In one embodiment, the apparatus may include a processor, memory in electronic communication with the processor, and instructions stored in the memory, the instructions being executable by the processor to perform the acts of encrypting data using an encryption key, writing the encrypted data to the apparatus, and retaining the encrypted data on the apparatus based at least in part on a validity of the encryption key.

A method for using encryption keys to manage data retention is also described. In one embodiment, the method may include receiving data such as user data from a host of the storage drive, encrypting the data using an encryption key, writing the encrypted data to the storage drive, and retaining the encrypted data on the storage drive based at least in part on a validity of the encryption key.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
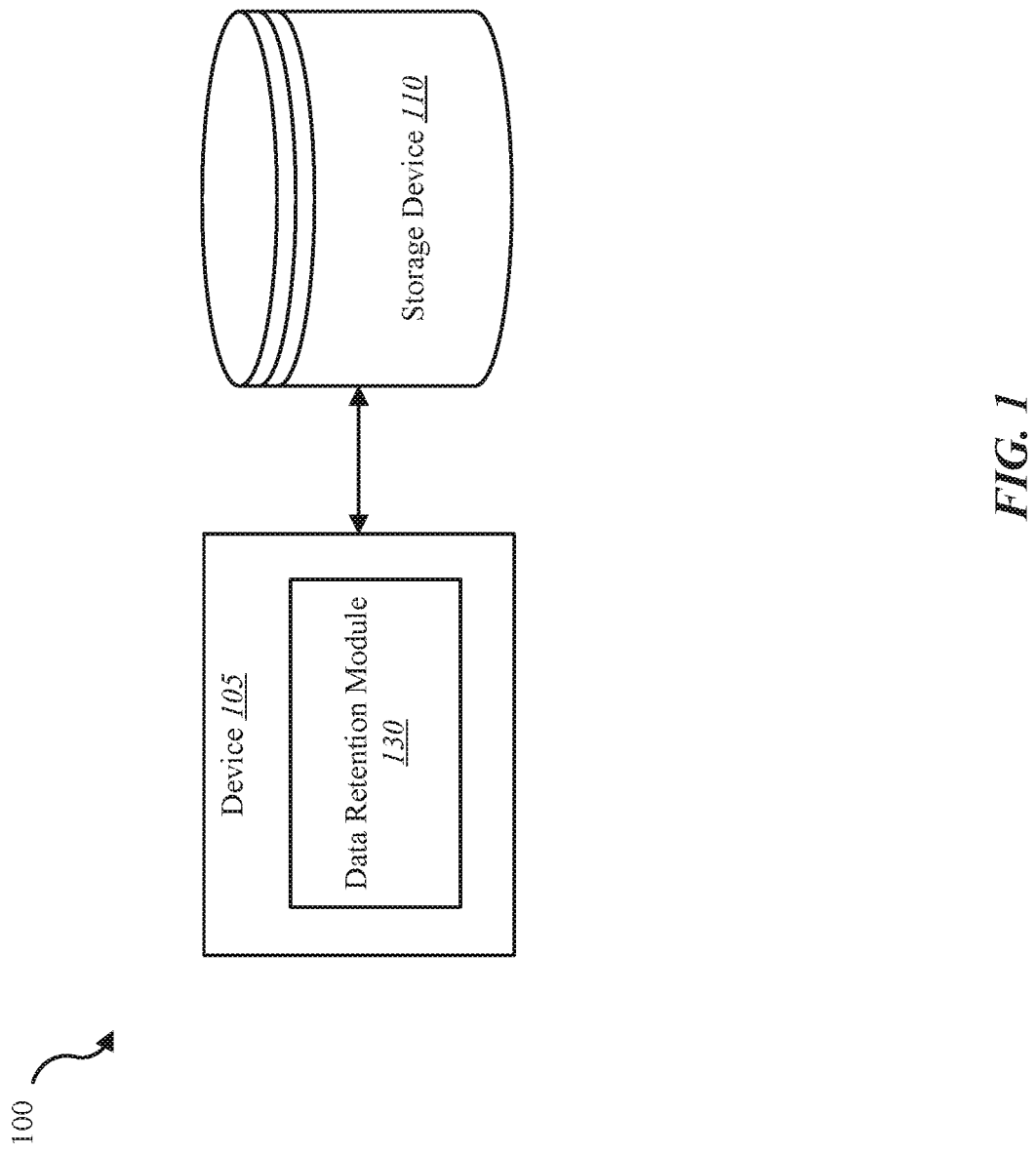
FIG. 1 is a block diagram of an example of a system in accordance with various embodiments.

The following relates generally to using encryption keys to manage data retention. In one embodiment, the present systems and methods may be associated with using encryption keys to manage retention of user data on a storage drive. In some cases, the present systems and methods may include using data encryption as a means to manage data retention policies. In some embodiments, the present systems and methods may associate an encryption key with data and apply a retention policy to that encryption key, enabling the expiration of the encryption key to control retention of the associated data.

Current data retention policies may be difficult if not impossible for an administrator to enforce at both the storage drive and the system level. Typically, when data expires, or is configured to expire, current systems may fail to ensure the data is actually destroyed as configured. In some cases, existing data retention policies may be enforced at the file system level by applications configured to scan and purge files that exceed retention limits. The task typically falls on the host to actively find and destroy data that is beyond its retention limit.

Managing data retention on storage devices is challenging for a variety of reasons. When a segment of data expires according to policy, it may be difficult for system software to track down the expired data. Data retention policies are often difficult to enforce at both the storage drive and system level. Moreover, expired data may pose a security and/or legal risk to an organization. In addition, expired data needlessly consumes storage drive capacity, which is not only expensive in terms of wasted space, but also in terms of performance and endurance of the storage drive. Storage drives may perform periodic garbage collection to make room for new data. During the garbage collection process, expired data may be recycled, resulting in needlessly consuming the storage drive's processing bandwidth and storage capacity, as well as reducing storage drive performance and endurance.

The present systems and methods solve this and other problems by associating an encryption key with data and applying a retention policy to that encryption key. The present systems and methods may automatically mark the data as expired upon satisfying a particular criterion by expiring/destroying the key associated with the data. When the key expires, at least a portion of the data associated with the key expires since the associated data becomes unreadable without the key. During the recycling process, expired data may be automatically discarded by being identified as associated with an expired key.

The present systems and methods may associate a particular encryption key with data written within a given time window. For example, an encryption key may be associated with a predetermined time period. The predetermined time period may include a period of one or more minutes, less than a minute, one or more hours, one or more days, one or more weeks, one or more months, or any combination thereof. Any data written to the storage drive within the designated time period may be associated with the particular encryption key. As a retention policy dictates, the encryption key associated with a given time window may expire. Upon expiring, the encryption key may be destroyed, rendering the associated data unreadable. Thus, data of a particular age automatically expires in relation to an expiration of an associated encryption key. When a controller attempts to read the data, the controller determines that the encryption key to read the data no longer exists. In one example, during the garbage collection process of a solid state drive (SSD), or as part of a background process, space belonging to data associated with an expired encryption key may be reclaimed. In some embodiments, an encryption key may be provided to the storage drive from the host. For example, an encryption key may be generated by the host and transferred to the storage drive in a host command to the storage drive. In some embodiments, the encryption key may be passed to the storage drive along with the data from the host. Additionally, or alternatively, an encryption key may be generated by the controller and/or a processor of the storage drive.

There are several means by which data may be associated with an encryption key with an associated retention policy. In one embodiment, the present systems and methods associate an encryption key with data as it is written within a given time window. In some embodiments, policies set in the storage drive configuration determine the retention policies for data written to the storage drive. The storage drive may determine the encryption key to associate with the data based on a set of criteria designated by the host and/or storage drive. In some cases, the criteria may include criteria for expiration of the key and associated data. In some embodiments, the criteria may designate the time or time window for a particular expiration key that is associated with data written during that time or time window.

In some embodiments, the criteria may associate an encryption key with a region or location on a storage drive. For example, a first region or location of the storage drive may be associated with a first encryption key. Thus, data written to the first region may be associated with the first encryption key, whereas data written to a second region or location may be blocked from being associated with the first encryption key. In some cases, data written to the second region may be associated with a second encryption key.

In some embodiments, the criteria for applying an encryption key and policy may be based on detecting the last time the data was accessed and/or a frequency of access associated with the data. Data may be associated with an encryption key based on the last access and/or frequency of access associated with the analyzed data. For example, analysis of first and second data may determine that first data has a relatively high frequency of access while second data has a relatively low frequency of access. Additionally, or alternatively, the analysis may determine that first data was accessed relatively recently while second has not been accessed for a relatively long time. Accordingly, the present systems and methods may associate the first data with a first encryption key and the second data with a second encryption key, where the first encryption key is configured with a relatively far term expiration and the second encryption key is configured with a relatively near term expiration, resulting in the second data expiring and being removed from the storage drive in a relatively short time while the first data continues to be retained.

In some cases, the expiration of the first encryption key may be dynamically updated based on the access metrics of the first data. For example, the expiration of the first encryption key may be extended based on a determination that the first data continues to have a relatively high frequency of access and/or is accessed within a certain period of time. As one example, the present systems and methods may analyze first data in relation to a period of one week. If the first data is accessed at least one or more times within a first week, then the expiration of the first encryption key may be extended such as for one week. If it is determined that the first data is accessed at least one or more times within a second week following the first week, then the expiration of the first encryption key may be extended again, and so forth. On the other hand, if it is determined that the first data is not accessed and/or a frequency of access for the first data fails to satisfy a frequency of access threshold, then the expiration of the first encryption key may be shortened and/or left unmodified. Accordingly, in some cases, the first encryption key may expire resulting in the first data also being deleted eventually.

In one embodiment, each encryption key has an associated expiration policy. In some cases, the expiration policy associated with a key may be time based. Additionally, or alternatively, the expiration policy for an encryption key may be based on instructions provided from a host command. In some embodiments, the retention policy may be provided by the host. The retention policy may be encapsulated with data from the host in some embodiments. In some cases, the retention policy passed down from the host may designate a time when the associated data expires.

Additionally, or alternatively, the retention policy may include a handle to an encryption key that has a set of retention policies provided by the host in a separate command and/or configured in the storage drive configuration by the manufacturer and/or an end user of the storage drive. In some embodiments, the means for transporting or conveying the retention policy may be to pass the data with the input/output (I/O) request associated with the data. In some embodiments, the retention policy for the data may be passed in separate metadata associated with the command transferring the data.

In some embodiments, a storage drive may include one or more non-volatile memories (NVMs). In some cases, a command from a host of the storage drive may direct the storage drive to write data to and/or read data from an NVM. In some embodiments, a controller of the storage drive may be enabled to use a map to translate between logical block addresses (LBAs) of the host storage protocol and physical storage locations in the NVM where the data is actually located. In further embodiments, the controller may be enabled to use a map to translate between objects of the host storage protocol and physical locations in the NVM. In various embodiments, the retention data stored with the host data may be stored in the controller's map structure. For example, a numeric value of the retention policy associated with the data may be placed in the mapping structure to describe the retention policy for the data. Additionally, or alternatively, in some embodiments, the retention policy may be stored in a header associated with the data in the NVM. In other embodiments, a simple expiry flag in the controller's map structure may indicate the associated data has a retention policy and that the retention policy is stored in a header associated (co-located) with the data.

In various embodiments, when the expiration policy for a key is met, the key may be destroyed. In still further embodiments, when the expiration policy for a key is met, the key may be sequestered and wrapped by a super user key. In some embodiments, wrapping data with the super user key may block the host from accessing the data, while the data remains on the storage drive available to a super user with access rights to the super user key. In some embodiments, a command may be sent to the controller to destroy the super user key resulting in deletion of the associated data.

The space associated with expired data may be reclaimed to free up space on the storage drive as well as improve endurance and performance. In various embodiments, the storage drive may detect data with expired keys during the garbage collection process and discard the data by removing the storage drive's mapping tables associated with the data and freeing the associated space. In some embodiments, the controller may employ a policy for searching for data with expired encryption keys. In various embodiments, the process may be triggered by the expiration of an encryption key. In some embodiments the search may entail scanning the controller's mapping table for entries containing a link or pointer to an expired encryption key such as a link to an expiry flag in the mapping table. In some embodiments, the scan of the controller's mapping table may be time based where a scan may be based on a timer, for example.

FIG. 1 is a block diagram illustrating one embodiment of an environment 100 in which the present systems and methods may be implemented. The environment may include device 105 and storage device 110. The storage device 110 may include any combination of hard disk drives, solid state drives, and hybrid drives that include both hard disk and solid state drives. In some embodiments, the systems and methods described herein may be performed on a single device such as device 105. In some cases, the methods described herein may be performed on multiple storage devices or a network of storage devices. Examples of device 105 include a storage server, a storage enclosure, a storage controller, storage drives in a distributed storage system, storage drives on a cloud storage system, storage devices on personal computing devices, storage devices on a server, or any combination thereof. In some configurations, device 105 may include a data retention module 130. In one example, the device 105 may be coupled to storage device 110. In some embodiments, device 105 and storage device 110 may be components of flash memory or solid state drive. Alternatively, device 105 may be a component of a host of the storage device 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage device 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network may include the Internet and/or an intranet. The device 105 may receive and/or send signals over a network via a wireless communication link. In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device.

In one embodiment, the storage device 110 may be internal to device 105. As one example, device 105 may include a storage controller that interfaces with storage media of storage device 110. In some embodiments, data retention module 130 may use encryption keys to manage data retention. For example, data retention module 130 may use encryption keys to manage the retention of data stored on storage device 110. Further details regarding data retention module 130 are disclosed below.

Figure 2:
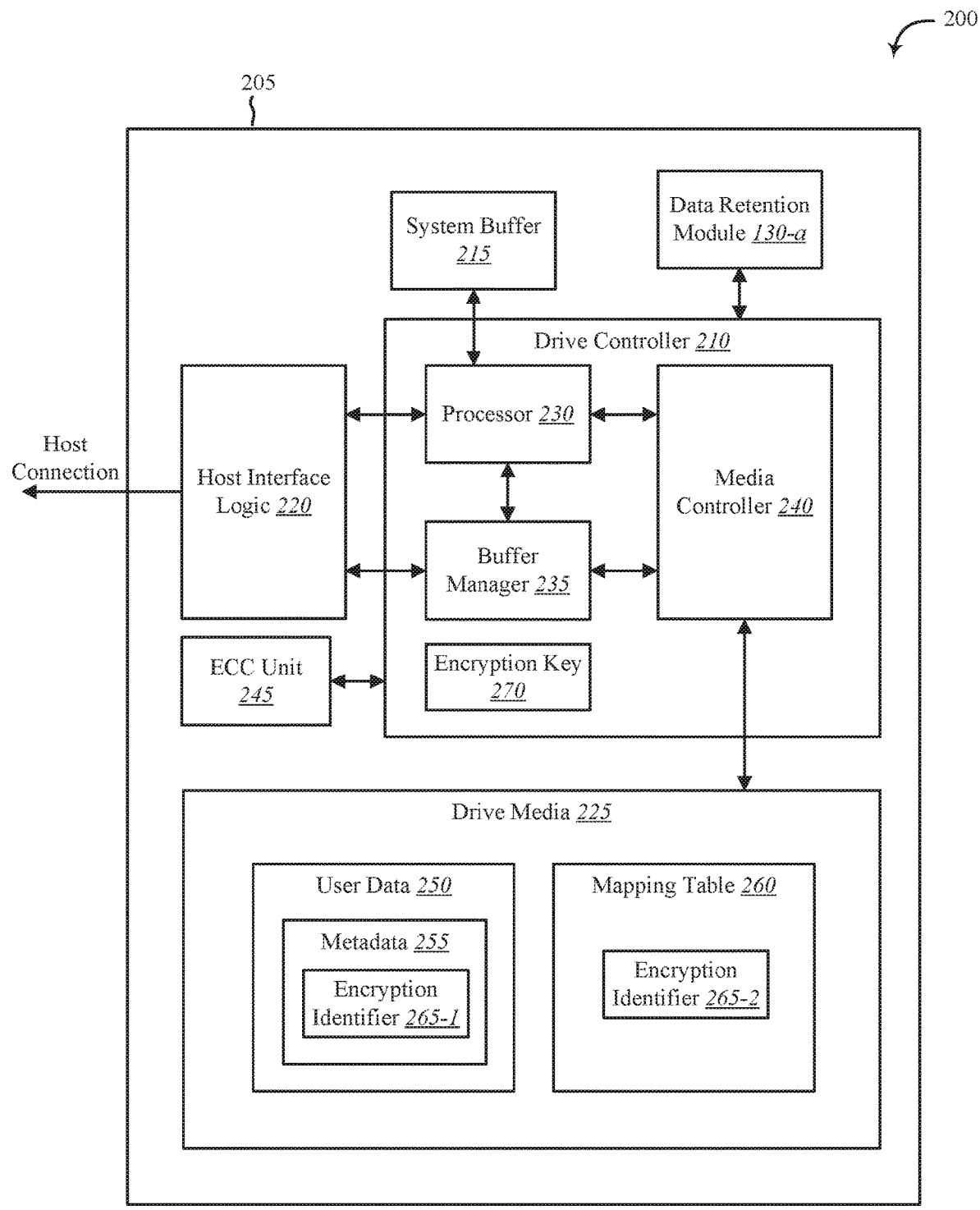
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, error correction code (ECC) unit 245, and data retention module 130-a. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other custom ICs, which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, media controller 240, and one or more encryption keys 270. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

Although depicted outside of drive controller 210, in some embodiments, data retention module 130-a may include software, firmware, and/or hardware located within drive controller 210. For example, data retention module 130-a may include at least a portions of processor 230, buffer manager 235, and/or media controller 240. In one example, data retention module 130-a may include one or more instructions executed by processor 230, buffer manager 235, and/or media controller 240. The data retention module 130-a may be configured to identify data received from a host of a storage drive and encrypt the received data using one or more encryption keys located in apparatus 205 such as the one or more encryption keys 270, for example. In one embodiment, the one or more encryption keys 270 may be programmed into drive controller 210 by a manufacturer of apparatus 205 and/or an end user of apparatus 205.

As depicted, drive media 225 may include user data 250 and mapping table 260. In some cases, mapping table 260 may represent two or more separate mapping tables. In one embodiment, data retention module 130-a may be configured to encrypt user data 250 and store the encrypted user data 250 on drive media 225. In some embodiments, user data 250 may include metadata 255. In one embodiment, data retention module 130-a may associate an encryption identifier with the encrypted data and store the encryption identifier on apparatus 205. For example, in one embodiment, encryption identifier 265-1 may be stored in metadata 255. Additionally, or alternatively, encryption identifier 265-2 may be stored in mapping table 260. In one embodiment, mapping table 260 may be associated with a logical block address (LBA) mapping table. In some cases, mapping table 260 may map one or more aspects of user data 250 in relation to drive media 225. In some embodiments, mapping table 260 may map system data to user data 250. In some embodiments, at least a portion of mapping table 260 may be stored on a computer chip, integrated circuit, a random access memory (RAM), or any combination thereof.

In one embodiment, the encryption and recovery of encrypted data may be performed by data retention module 130-a independently and/or separately from error correction performed by ECC unit 245. For example, data retention module 130-a may decrypt encrypted user data stored in drive media 225 such as user data 250. After decrypting the user data, drive controller 210 may determine that the decrypted user data includes one or more errors. Accordingly, ECC unit 245 may perform one or more error correction operations to correct the errors in the decrypted user data.

Figure 3:
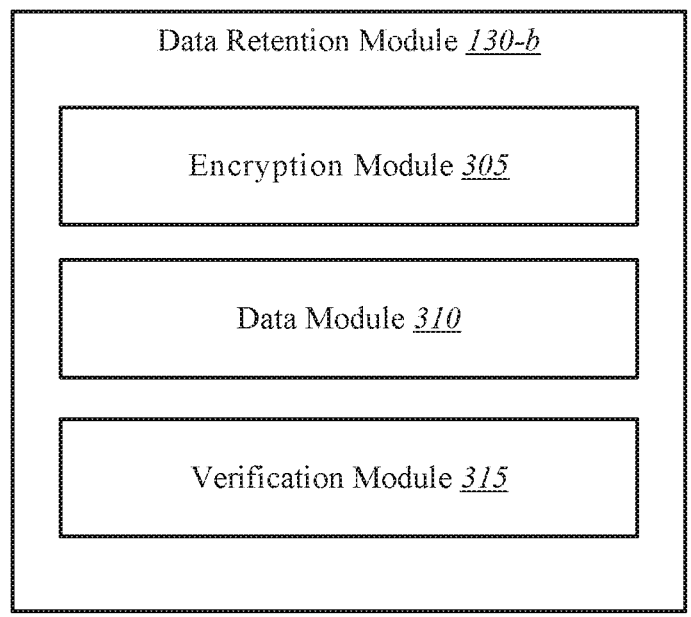
FIG. 3 shows a block diagram of one or more modules in accordance with various aspects of this disclosure.

FIG. 3 shows a block diagram of a data retention module 130-b. The data retention module 130-b may include one or more processors, memory, and/or one or more storage devices. The data retention module 130-b may include encryption module 305, data module 310, and verification module 315. The data retention module 130-b may be one example of data retention module 130 of FIGS. 1 and/or 2. Each of these components may be in communication with each other.

In one embodiment, encryption module 305 may be configured to encrypt data using an encryption key. In some cases, the encrypted data may be associated with a storage drive. For example, the encrypted data may include user data stored on a storage drive. In some embodiments, data module 310 may be configured to write the encrypted data to the storage drive. For instance, a host of the storage drive may send user and/or system data to the storage drive. Data module 310 may identify the data as user data and/or as system data. In one embodiment, encryption module 305 may encrypt the user data using an encryption key and data module 310 may store the encrypted data on a storage medium of the storage drive such as a platter of a hard disk drive, flash memory of a solid state drive, or a platter and/or flash memory of a hybrid drive. In some embodiments, encryption module 305 instruct data module 310 to store the system data without encryption.

In some embodiments, data module 310 may be configured to identify system data and to store the system data on the storage drive. In one embodiment, encryption module 305 may be configured to bypass associating an encryption key with the system data to prevent the system data from being discarded due to an expired, invalid, and/or deleted encryption key associated with the system data. In some embodiments, encryption module 305 may associate the system data with an encryption key. In some cases, the encryption key associated with the system data may be configured without an expiration or the expiration policy associated with the encryption key may specify this encryption key never expires, enabling the system data to be retained independent of an expiration of an encryption key. Since the associated encryption key does not expire, the associated encryption key may be retained indefinitely, and thus, the system data is not automatically discarded from the storage drive due to an expired encryption key.

In some embodiments, verification module 315 may be configured to retain the encrypted data on the storage drive based at least in part on a validity of the encryption key. In some embodiments, encryption module 305 may be configured to assign an encryption identifier to the encryption key, the encryption key being programmed in the controller. In some cases, the validity of the encryption key may be determined based at least in part on the encryption identifier.

In some embodiments, data module 310 may be configured to store the encryption identifier of the encryption key in metadata associated with the encrypted data. For example, the encryption identifier may be stored in a header and/or other metadata of the user data.

In some embodiments, verification module 315 may be configured to identify an expiration policy of the encryption key. The expiration policy may be specified by a user of the storage drive. In some cases, a host of the storage drive may specify an expiration policy. In some embodiments, an expiration policy may be generated for each batch of data. In one embodiment, an expiration policy may be associated with one or more applications installed on a host of the storage drive. For example, a first application may have a first expiration policy, a second application may have a second expiration policy different from the first expiration policy, and so forth. For instance, the first expiration policy may specify that data generated by the first application expires 6 months after creation, while the second expiration policy may specify that data generated by the second application expires 12 months after creation.

As one example, a third expiration policy may specify that data generated by a third application does not expire. In one embodiment, a first encryption key may be associated with the first application, a second encryption key may be associated with the second application, a third encryption key may be associated with the third application, and so forth. As one example, after the expiration of the first encryption key lapses, the encryption module 305 may destroy the first encryption key. All data associated with this first encryption key is made inaccessible by the destruction of the first encryption key. In some embodiments, the encryption module 305 may generate a replacement first encryption key for the first application upon destroying the original first encryption key. Accordingly, any data from the first application received by the data module 310 subsequent to the encryption module 305 destroying the original first encryption key may be encrypted by the encryption module 305 using the replacement first encryption key.

In some embodiments, data module 310 may be configured to store the encryption identifier in a mapping table. In some cases, the mapping table may map a logical block address (LBA) with a physical location on the storage drive. For example, the LBA may indicate a logical location of the encrypted data in relation to a host of the storage drive that is mapped to a physical location where the encrypted data is physically stored on the storage drive.

In some embodiments, data module 310 may be configured to receive a command to read the encrypted data from the storage medium of the storage drive. For example, a host of the storage drive may send a command to read the encrypted data. Upon receiving the command to read the encrypted data, an encryption key used to encrypt the data may be validated. In one embodiment, verification module 315 may be configured to acquire the encryption identifier associated with the encrypted data. In some embodiments, verification module 315 may acquire the encryption identifier from a designated storage location of one or more encryption identifiers. As one example, the encryption identifier may be stored in metadata associated with the encrypted data. Additionally, or alternatively, the encryption identifier may be stored in a mapping table associated with the encrypted data. For example, an entry of a mapping table may indicate a physical location on the storage medium of the storage drive where the encrypted data is physically located. A host of the storage drive may be configured to locate user data according to a virtual addressing system such as a logical block address (LBA) or a range of LBAs for each set of user data. Accordingly, in one embodiment, the entry in the mapping table may indicate one or more LBAs associated with the encrypted data, mapping the physical location of the encrypted data to the host's logical or virtual location.

In one embodiment, the entry may include a field that stores information related to the encryption identifier. For example, in some embodiments, the encryption identifier field may store the encryption identifier. Additionally, or alternatively, the encryption identifier field may point to a location where the encryption identifier is stored. For example, the encryption identifier may be stored in a non-volatile memory of the storage drive, separate from a primary storage medium of the storage drive.

In some embodiments, verification module 315 may be configured to verify a validity of the encryption key based at least in part on acquiring the encryption identifier. In some cases, the encryption identifier may include a pointer to an encryption key used to encrypt the associated encrypted data. Upon locating the encryption key, in some embodiments, encryption module 305 may be configured to decrypt the encrypted data using the encryption key upon determining the encryption key is valid. In some embodiments, data module 310 may be configured to transfer the decrypted data to the host. In some embodiments, data module 310 may be configured to remove one or more LBAs associated with the encrypted data from a mapping table upon determining the encryption key is invalid. Upon removal of the LBAs, the physical location holding the encrypted data becomes available for writing new data. In one embodiment, a garbage collection routine may reclaim the freed up physical location to store new data. In one embodiment, a host of the storage drive may send a trim command to reclaim the physical space for new data. In some embodiments, data module 310 may be configured to discard the encrypted data from the storage media based at least in part on the destruction of the encryption key associated with the encrypted data.

Figure 4:
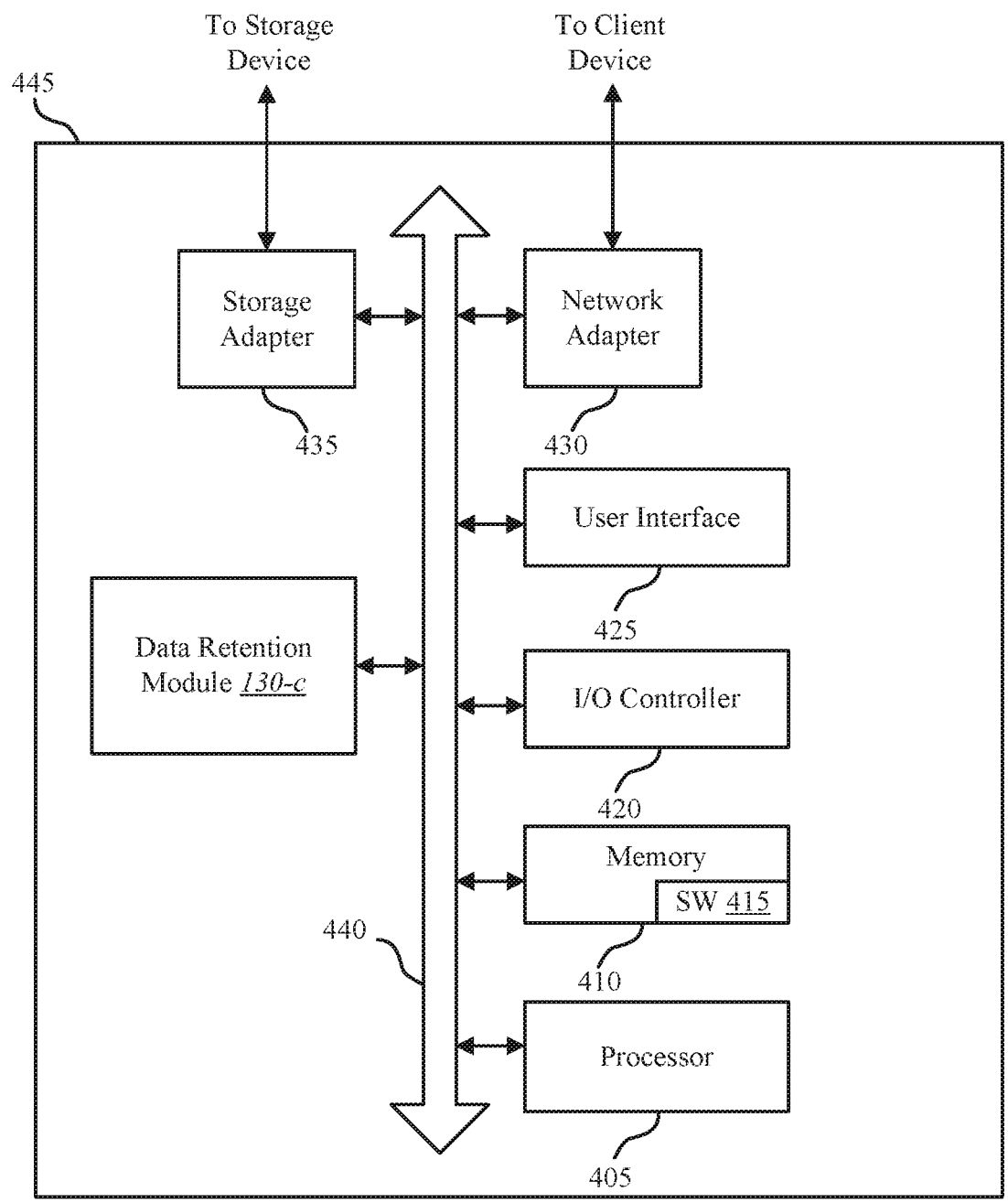
FIG. 4 shows a diagram of a system in accordance with various aspects of this disclosure.

FIG. 4 shows a system 400 for using encryption keys to manage data retention, in accordance with various examples. System 400 may include an apparatus 445, which may be an example of any one of device 105 of FIG. 1 and/or device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally—via one or more wired links and/or wireless links—with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include a data retention module 130-c, which may perform the functions described above for the data retention module 130 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash RAM, dynamic RAM (DRAM), synchronous DRAM (SDRAM), double data rate (DDR) RAM, other types of RAM, or any combination thereof. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), or any combination thereof.

In some embodiments, the memory 410 may contain, among other things, the Basic Input-Output system (BIOS) which may control basic hardware and/or software operation such as the interaction with peripheral components or devices. For example, at least a portion of the data retention module 130-c to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to one or may be included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter may include one or more of an Ethernet adapter, a Fibre Channel adapter, Fibre Channel Protocol (FCP) adapter, a SCSI adapter, and iSCSI protocol adapter.

Figure 5:
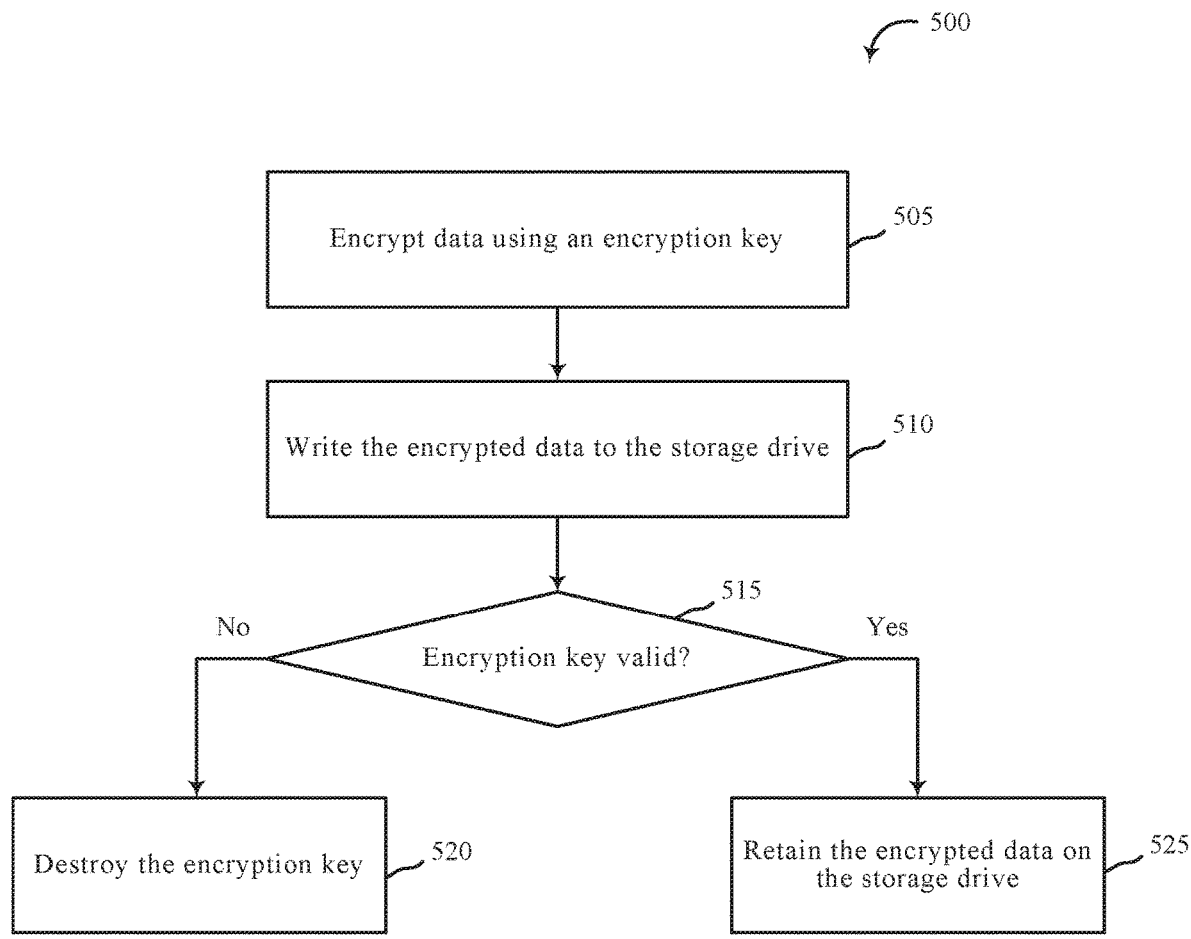
FIG. 5 is a flow chart illustrating an example of a method in accordance with various aspects of this disclosure.

FIG. 5 is a flow chart illustrating an example of a method 500 for using encryption keys to manage data retention, in accordance with various aspects of the present disclosure. One or more aspects of the method 500 may be implemented in conjunction with device 105 of FIG. 1, apparatus 205 of FIG. 2, and/or data retention module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method 500 may include encrypting data using an encryption key. In some cases, the data may be data provided by a host of a storage drive. In some embodiments, the data may include user data provided by the host. In some embodiments, the host may provide the encryption key with the data. Additionally, or alternatively, the encryption key may be generated by the storage drive. Additionally, or alternatively, the encryption key may be programmed into the storage drive by a manufacturer and/or an end user of the storage drive. At block 510, the method 500 may include writing the encrypted data to the storage drive. In some cases, the method 500 may include writing the encrypted data to a primary storage medium of the storage drive. Additionally, or alternatively, the method 500 may include writing the encrypted data to one or more non-volatile memories of the storage drive. At block 515, the method 500 may include determining whether an encryption key is valid. At block 520, the method 500 may include destroying the encryption key upon determining the encryption key is not valid. At block 525, the method 500 may include retaining the encrypted data on the storage drive upon determining the encryption key is valid.

The operation(s) at block 505-525 may be performed using the data retention module 130 described with reference to FIGS. 1-4 and/or another module. Thus, the method 500 may provide for using encryption keys to manage data retention relating to using encryption keys to manage data retention. It should be noted that the method 500 is just one implementation and that the operations of the method 500 may be rearranged, omitted, and/or otherwise modified such that other implementations are possible and contemplated.

Figure 6:
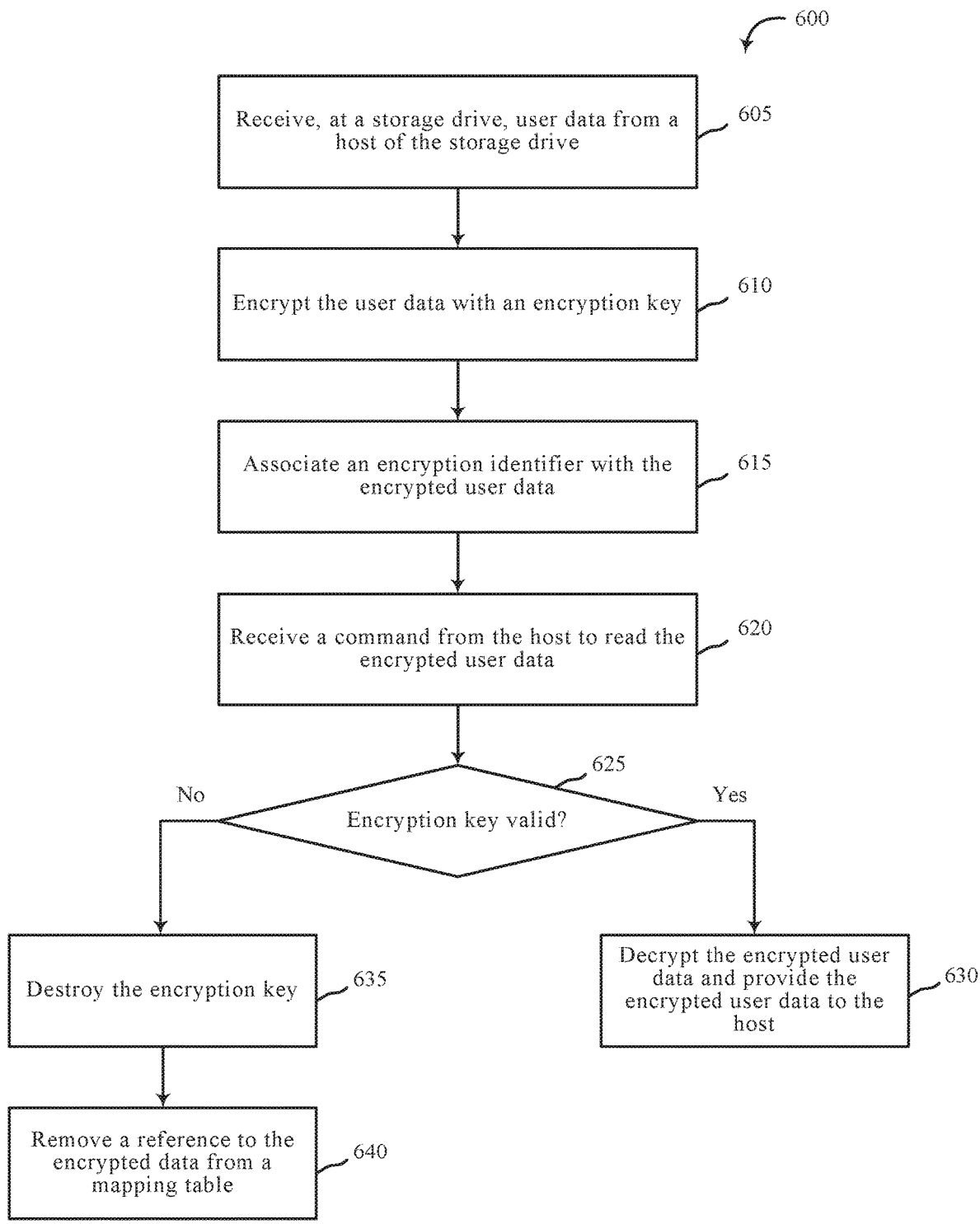
FIG. 6 is a flow chart illustrating an example of a method in accordance with various aspects of this disclosure.

FIG. 6 is a flow chart illustrating an example of a method 600 for using encryption keys to manage data retention, in accordance with various aspects of the present disclosure. One or more aspects of the method 600 may be implemented in conjunction with device 105 of FIG. 1, apparatus 205 of FIG. 2, and/or data retention module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

In one embodiment, at block 605, the method 600 may include receiving, at a storage drive, user data from a host of the storage drive. In some embodiments, method 600 may include receiving data and determining whether the received data includes system data and/or user data. When the method 600 determines the received data includes system data, then the method 600 may save the system data without an encryption key. In some cases, the method 600 may save the system data with an encryption key that has no expiration. Otherwise, upon determining the received data includes user data, the method 600 may encrypt the user data and store the encrypted user data on the storage drive. At block 610, method 600 may include encrypting the user data with an encryption key.

At block 615, the method 600 may include associating an encryption identifier with the encrypted user data. In some cases, the method 600 may include storing the encryption identifier in metadata of the user data and/or a mapping table associated with the user data. At block 620, the method 600 may include receiving a command from the host to read the encrypted user data. In some cases, the command to read the encrypted user data may be generated from a host and sent by the host to the storage drive. At block 625, the method 600 may include determining whether the encryption key is valid. For example, upon receiving the command to read the encrypted data, the method 600 may include verifying the encryption key used to encrypt the user data. In some cases, the method 600 may include identifying the encryption key based at least in part on locating the encryption identifier associated with the data.

Upon determining the encryption key is valid, at block 630, the method 600 may include decrypting the encrypted user data and provide the encrypted user data to the host. Upon determining the encryption key is invalid, at block 635, the method 600 may include destroying the encryption key. At block 640, the method 600 may include removing a reference to the encrypted data from a mapping table. For example, in some cases, the method 600 may remove from a mapping table one or more logical block addresses associated with the encrypted user data. In some cases, the method 600 may locate and delete the user data based at least in part on the destruction of the encryption key.

The operations at blocks 605-640 may be performed using the data retention module 130 described with reference to FIGS. 1-4 and/or another module. Thus, the method 600 may provide for using encryption keys to manage data retention relating to using encryption keys to manage data retention. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising:
  a storage drive comprising a controller and a data retention module, the data retention module configured to:
    associate data with an encryption key according to a retention policy with a circuit of a verification module, the encryption key having a key expiration date selected to coincide with an expiration date of the data set by the data retention module;
    encrypt data using the encryption key;
    write the encrypted data and an encryption identifier corresponding with the encryption key to the storage drive;
    scan the storage drive for the encryption identifier in response to a data read request for the encrypted data;

decrypt the encrypted data with the encryption key in response to the data read request being tendered within the expiration date of the data; and make storage space of the storage drive associated with the encrypted data available for storage of data different from the encrypted data after determining the data read request is tendered after the encryption key expiration date by removing one or more logical block addresses (LBA) associated with the encrypted data from a mapping table.

2. The storage system of claim 1, wherein user data is blocked from being stored in the first storage area.

3. The storage system of claim 1, wherein the first storage area comprises the mapping table that maps the (LBA) of the encrypted data with a physical location on the storage drive.

4. The storage system of claim 1, comprising the controller to:

receive the data from a host of the storage drive, the data including user data.

5. The storage system of claim 1, comprising the controller to:

store an encryption identifier of the encryption key in metadata associated with the encrypted data; and identify an expiration policy of the encryption key from the encryption identifier.

6. The storage system of claim 1, wherein the data read request designates the LBA mapped in the mapping table.

7. The storage system of claim 5, comprising the controller to:

acquire the encryption identifier associated with the encrypted data in response to the data read request.

8. The storage system of claim 7, comprising the controller to:

verify a validity of the encryption key based at least in part on acquiring the encryption identifier.

9. The storage system of claim 1, comprising the controller to:

delete the encryption key in response to the expiration of the key expiration date.

10. The storage system of claim 1, comprising the controller to:

keep the encrypted data in the storage drive after removing the one or more LBA from the mapping table.

11. A method comprising:

connecting a controller of a storage drive to a data retention module;

associating user data with an encryption key according to a retention policy, the encryption key having a key expiration date selected by the data retention module to match an expiration date of the user data set by the data retention module;

encrypting the user data using the encryption key;

writing the encrypted user data and an encryption identifier corresponding with the encryption key to the storage drive;

scanning the storage drive for the encryption identifier in response to a data read request for the encrypted user data;

decrypting the encrypted user data with the encryption key in response to the data read request being tendered within the expiration date of the data; and making storage space of the storage drive associated with the encrypted user data available for storage of data different from the encrypted user data after determining the encryption key data read request is tendered after the encryption key expiration date by removing one or more logical block addresses (LBA) associated with the encrypted user data from a mapping table.

12. The method of claim 11, wherein user data is blocked from being stored in a first portion of the storage drive separate from a second portion of the storage drive where the encrypted user data is stored.

13. The method of claim 11, wherein the first storage area comprises a mapping table that maps a logical block address (LBA) of the encrypted data with a physical location on the storage drive.

14. The method of claim 11, comprising the controller to:

receive the data from a host of the apparatus, the data including user data.

15. The method of claim 11, comprising the controller to:

store the encryption identifier of the encryption key in metadata associated with the encrypted data; and identify an expiration policy of the encryption key.

16. The method of claim 11, comprising the controller to:

receive a command to read the encrypted data from the storage drive.

17. The method of claim 16, comprising the controller to:

acquire the encryption identifier associated with the encrypted data.

18. The method of claim 17, comprising the controller to:

verify a validity of the encryption key based at least in part on acquiring the encryption identifier.

19. The method of claim 11, wherein user data is blocked from being stored in the mapping table that maps the (LBA) of the encrypted user data with a physical location on the storage drive.

20. The method of claim 11, wherein the encrypted user data is removed during a garbage collection process after the expiration date of the encryption key.

* * * * *